United States Patent
Schaetzmueller-Barajas

(10) Patent No.: US 7,731,228 B2
(45) Date of Patent: Jun. 8, 2010

(54) STEERING WHEEL FOR A MOTOR VEHICLE WITH A GAS BAG MODULE

(75) Inventor: Mónica Schaetzmueller-Barajas, Partenstein (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 1287 days.

(21) Appl. No.: 11/072,841

(22) Filed: Mar. 4, 2005

(65) Prior Publication Data

US 2005/0194770 A1   Sep. 8, 2005

(30) Foreign Application Priority Data

Mar. 5, 2004   (DE) .................. 20 2004 003 464 U

(51) Int. Cl.
*B60R 21/16*   (2006.01)

(52) U.S. Cl. ...................................... 280/731
(58) Field of Classification Search .................. 280/731
See application file for complete search history.

(56) References Cited

U.S. PATENT DOCUMENTS

| | | | |
|---|---|---|---|
| 3,799,576 A * | 3/1974 | Fiala | 280/731 |
| 3,843,152 A | 10/1974 | Nonaka | |
| 5,398,963 A | 3/1995 | Fohl | |
| 6,082,765 A * | 7/2000 | Bowers et al. | 280/742 |
| 6,357,791 B1 | 3/2002 | Faigle et al. | |
| 6,547,274 B2 | 4/2003 | Ochiai | |
| 6,676,155 B2 * | 1/2004 | Grosch et al. | 280/731 |
| 2004/0012180 A1 | 1/2004 | Hawthorn et al. | |

FOREIGN PATENT DOCUMENTS

| | | |
|---|---|---|
| DE | 29906477 | 9/1999 |
| DE | 10032791 | 2/2002 |
| DE | 10130311 | 2/2002 |
| DE | 20107297 | 10/2002 |
| EP | 0582335 | 2/1994 |
| EP | 0614787 | 9/1994 |
| EP | 1279574 | 1/2003 |
| EP | 1394001 | 3/2004 |

\* cited by examiner

*Primary Examiner*—Faye M. Fleming
(74) *Attorney, Agent, or Firm*—Tarolli, Sundheim, Covell & Tummino LLP

(57) ABSTRACT

A steering wheel for a motor vehicle has a gas bag module (12) including a covering cap (14) and a gas bag (22). At least one vent opening (18) for diverting the gas is provided in the covering cap (14), in a foam (16) surrounding the steering wheel skeleton or in the hub region (20) of the steering wheel.

6 Claims, 2 Drawing Sheets

STEERING WHEEL FOR A MOTOR VEHICLE WITH A GAS BAG MODULE

BACKGROUND OF THE INVENTION

The invention relates to a steering wheel for a motor vehicle, the steering wheel comprising a gas bag module.

Various gas bag modules are known, in which vent openings are provided. By means of the vent openings, an excess pressure in the interior of the gas bag, which may occur during the filling of the gas bag or on penetration of a vehicle occupant into the gas bag, is to be reduced.

From the European patent application EP 0 614 787 A1 a gas bag restraint system is known, in which a controlled escaping of the filling gas is made possible through a seal gap formed between the steering wheel hub and a distributor chamber surrounding the steering wheel shaft.

In the German patent application DE 100 32 791 A1 and in the German utility model DE 201 07 297 U1, gas bag modules with vent openings provided in the gas generator carrier are shown. The gas is diverted into the hub region of the steering wheel, in order to make possible an escape of the gas into the interior of the module.

In the gas bag modules shown in the German utility model DE 299 06 477 U1, vent openings are provided in the gas generator carrier and in the module housing.

In order to compensate the stability losses of the corresponding components, in particular of the gas generator carrier, caused by the vent openings, these components must either be constructed so as to be more stable, or additional reinforcement components must be used, whereby the costs for the components and the assembly increase.

It is an object of the invention to achieve a reliable escape of the gas introduced into the gas bag, without additional components and without additional assembly expenditure.

BRIEF SUMMARY OF THE INVENTION

According to a first aspect of the invention, a steering wheel for a motor vehicle comprises a gas bag module including a covering cap and a gas bag. At least one vent opening for diverting the gas is provided in the covering cap.

According to a second aspect of the invention, a steering wheel for a motor vehicle comprises a steering wheel skeleton surrounded by a foam, and a gas bag module including a gas bag. At least one vent opening for diverting the gas is provided in the surrounding foam.

According to a third aspect of the invention, a steering wheel for a motor vehicle comprises a hub and a gas bag module including a gas bag. At least one vent opening for diverting the gas is provided in the hub region of the steering wheel.

Thus, in accordance with the invention, the vent openings are not (only) provided in the gas generator carrier, but (also) in components which either do not substantially contribute to the stability of the gas bag module, or which do not require any additional reinforcement despite the vent openings. Therefore, no additional manufacturing process is necessary.

Owing to the high temperature of the gas and the possible presence of hot particles, it is advantageous that the gas escaping through the vent opening is at least partly diverted into the interior of the gas bag module, i.e. into regions which are not dangerous for the vehicle occupant.

DETAILED DESCRIPTION OF THE INVENTION

Figure 1:
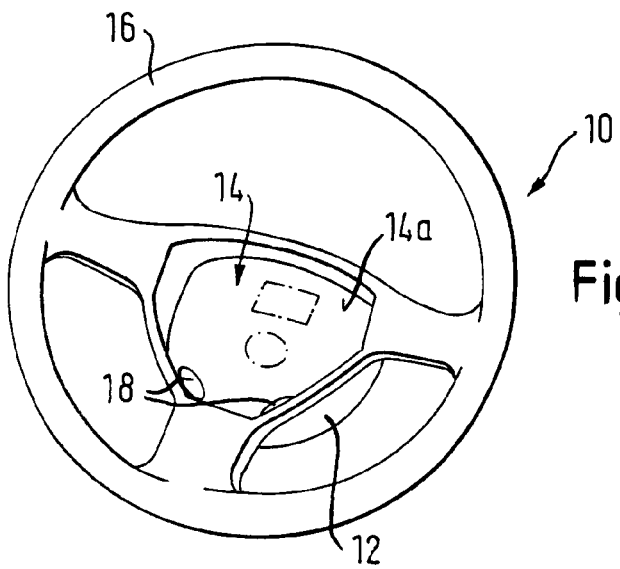
FIG. 1 shows a perspective view of a steering wheel according to the invention with a gas bag module.

In FIG. 1 a steering wheel 10 according to the invention with a gas bag module 12 is illustrated. The gas bag module 12 includes a module housing with a covering cap 14 having a front wall 14a facing the driver. In the module housing, a gas generator and a gas bag are housed. Both in the front wall 14a of the covering cap 14 beyond the region that is opened on deployment of the gas bag and also in the surrounding foam 16 of the steering wheel skeleton, vent openings 18 are provided at particular sites.

Therefore, part of the gas which is introduced into the gas bag can be diverted via the vent openings 18 into the gas bag module 12 or into other regions which are not dangerous for the driver, in order to reduce the pressure in the interior of the gas bag.

Figure 2:
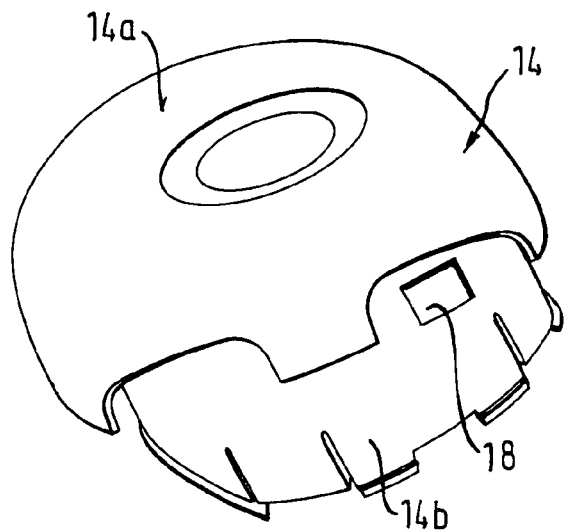
FIG. 2 shows a perspective view of a gas bag module covering cap of a steering wheel according to the invention.

In the covering cap 14 shown in FIG. 2, vent openings 18 are provided in an encircling side wall 14b.

Figure 3A:
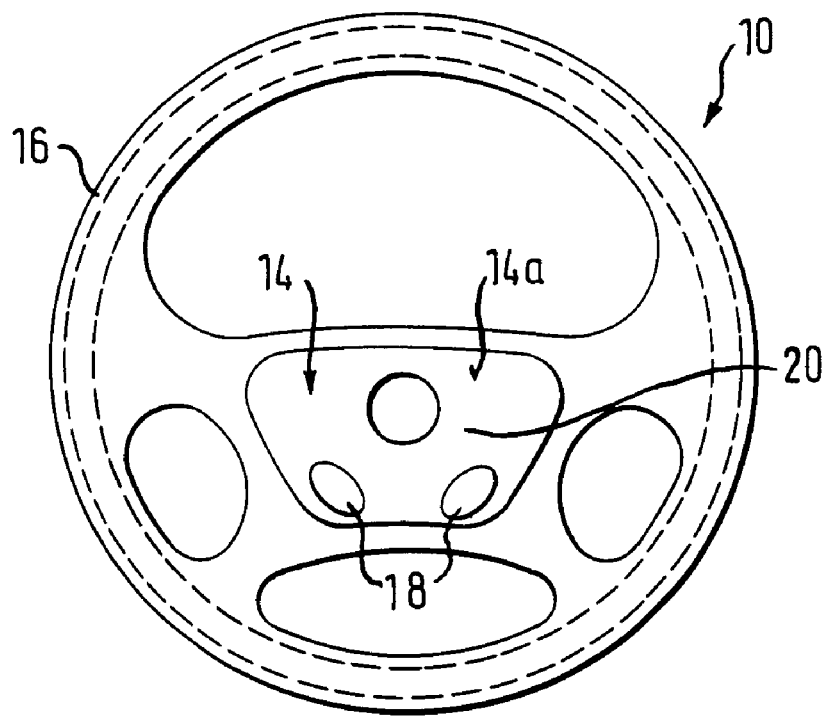
FIG. 3a shows a top view of a steering wheel according to the invention without the gas bag module.
Figure 3B:
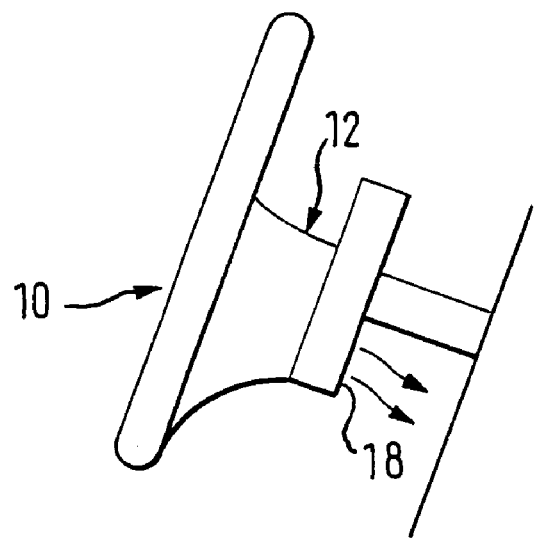
FIG. 3b shows a diagrammatic side view of the steering wheel of FIG. 3a with the gas bag module.

In the steering wheel 10 shown in FIGS. 3a and 3b, vent openings 18 are provided in the hub region 20 of the steering wheel 10, through which a part of the gas can be diverted, e.g. into the interior of the hub.

Figure 4:
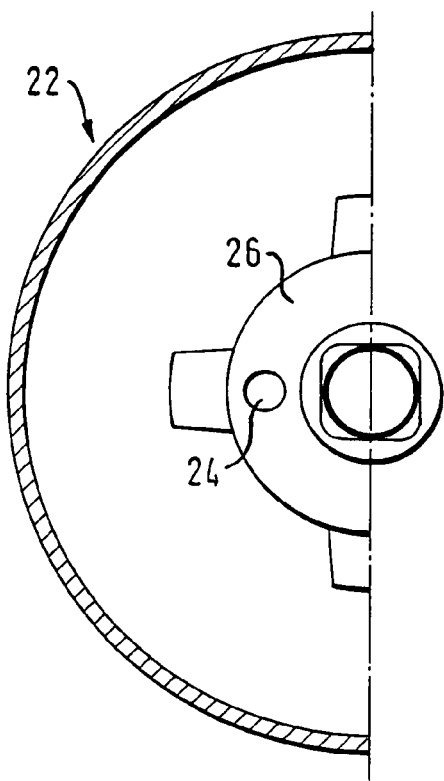
FIG. 4 shows a top view of a gas bag of a steering wheel according to the invention.

In FIG. 4 an example of a gas bag 22 of a steering wheel 10 according to the invention is illustrated. The gas bag 22 has outflow openings 24 in the region 26 around the inflation opening of the gas bag 22, so that part of the gas can be diverted through the vent openings 18 formed in the side wall 14b.

The flow of the diverted gas inside the gas bag module 12 or the steering wheel 10 can be intentionally influenced by suitable guiding arrangements.

In a steering wheel 10 according to the invention, one or more vent openings 18 can either be provided only in the front wall 14a of the covering cap 14, only in the side wall 14b of the covering cap 14 or only in the hub region 20 of the steering wheel 10, or vent openings 18 may be provided in more of the before-mentioned portions/regions.

The invention claimed is:

1. A steering wheel for a motor vehicle, the steering wheel comprising a gas bag module (12) including a gas bag (22) and a covering cap (14) having a front wall (14a) facing a driver and a side wall (14b), at least one vent opening (18) is provided in the covering cap (14) for diverting the gas escaping through the vent opening (18) into the interior of the gas bag module (12).

2. The steering wheel according to claim 1, wherein the vent opening (18) is provided in the side wall (14b).

3. The steering wheel according to claim 2, wherein the gas bag (22) has outflow openings (24) in the region (26) around the inflation opening of the gas bag (22).

4. A steering wheel for a motor vehicle, the steering wheel comprising a steering wheel skeleton surrounded by a foam (16), and a gas bag module (12) including a gas bag, characterized in that at least one vent opening (18) for diverting the gas is provided in the surrounding foam (16).

5. The steering wheel according to claim 4, characterized in that the gas escaping through the vent opening (18) is diverted into the interior of the gas bag module (12).

6. The steering wheel according to claim 1, wherein the vent opening (18) is provided in the front wall (14a) of the covering part (14).

* * * * *